F. SLOAN.
Cotton Seed Planter.
No. 107,730.   Patented Sept. 27, 1870.
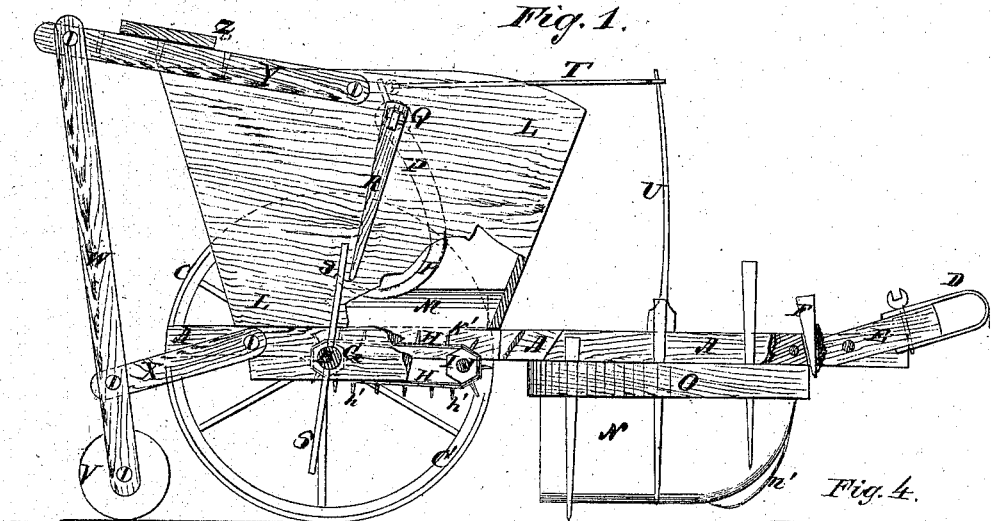
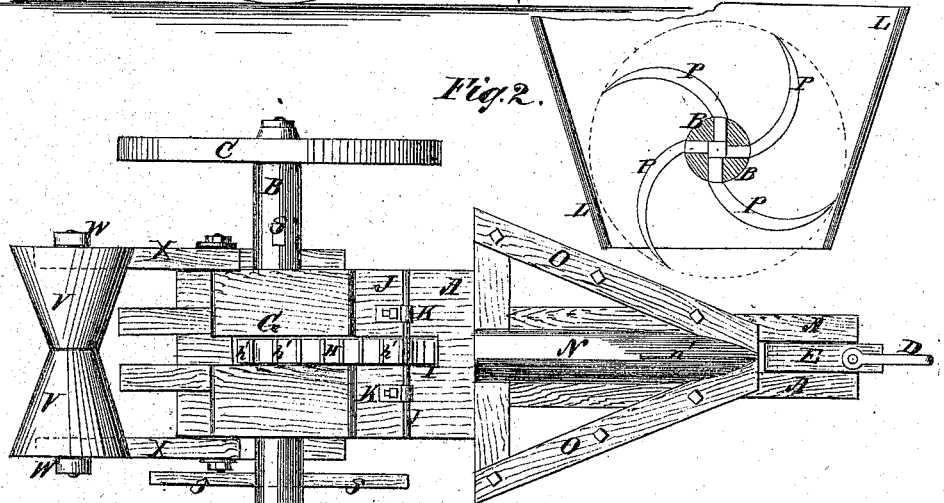
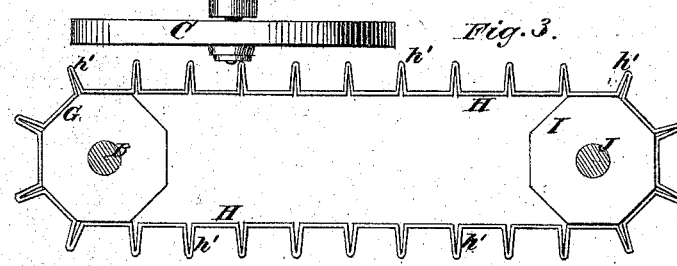
Witnesses:
John Becker
L. S. Mabee
Inventor:
F. Sloan
per Munn & Co.
Attorneys.

United States Patent Office.

FLETCHER SLOAN, OF BOLIVAR, TENNESSEE.

Letters Patent No. 107,730, dated September 27, 1870.

IMPROVEMENT IN COTTON-SEED PLANTERS.

The Schedule referred to in these Letters Patent and making part of the same

*To all whom it may concern:*

Be it known that I, FLETCHER SLOAN, of Bolivar, in the county of Hardeman and State of Tennessee, have invented a new and useful Improvement in Cotton-seed Planter; and I do hereby declare that the following is a full, clear, and exact description thereof, which will enable others skilled in the art to make and use the same, reference being had to the accompanying drawing forming part of this specification, in which—

Figure 1 is a side view of my improved cotton-seed planter, parts being broken away to show the construction.

Figure 2 is an under-side view of the same.

Figure 3 is a detail side view of the endless-belt carrier.

Figure 4 is a detail view of a modified form of the agitating device.

Similar letters of reference indicate corresponding parts.

The invention relates to improvements in cotton-seed planters, by which they shall be rendered simpler in construction, more effective in operation, and adapted to be readily adjusted for planting other seeds than cotton, or for distributing guano, and other fertilizers.

The invention consists in constructing the endless belt or carrier of a strip of metal, struck up or bent to form the teeth; in the arrangement of a spring-retracting device with the agitator; in the manner of adjusting the angle of the tongue to the main frame; and in the arrangement of radial arms with the axle, so as to operate the agitator, as hereinafter set forth.

A is the bed-frame of the machine.

B is the axle, which works in bearings formed in or attached to the bed-frame A, as shown in fig. 1.

C are the wheels, one of which revolves loosely upon the axle B, and the other of which is rigidly connected with said axle, so as to carry the axle with it in its revolution.

D is the clevis, which is attached to the block E by a clevis-pin or bolt, in the ordinary manner.

The clevis-block E is pivoted in a slot in the forward end of the bed-frame A, and its rear end may be beveled off or made cam-shaped, so that the said block may be secured in place when adjusted by a wedge, F, placed between its rear end and the rear end of the slot in which said block is pivoted, as shown in fig. 1, thus enabling the elevation of the draft-point, and, consequently, the depth at which the machine works in the ground, to be regulated at will.

The middle part of the bed-frame A, above and in front of the axle B, is slotted, and to the middle part of the axle, in the rear part of said slot, is attached a pulley, G, around which passes an endless chain or belt, H. The chain or belt H also passes around a pulley, I, placed in the forward part of the said slot, and revolving upon a rod, J, the ends of which pass through eyes, brackets, staples, or keepers, K, which should be adjustably attached to the bed-frame A, so that the tension of the belt or chain H may be regulated by adjusting the position of the said staples, brackets, or keepers, K.

To the belt or chain H, at suitable distances apart, are attached flanges, *h'*. The flanges *h'* may be formed by bending strips of thin sheet metal, of the proper length and breadth, together at their middle points, and bending the ends of said strips out at right angles.

The projecting ends are then bolted, riveted, or otherwise secured to said chain or belt H.

The pulleys G and I may be cylindrical or polygonal in form, as may be desired, or as the construction of the belt or chain H may require.

The endless-belt carrier H may be made of a continuous strip of sheet-steel, bent at points at suitable distances apart, to form projecting angles or teeth *h'*, as shown in fig. 3.

The belt, thus constructed, will adapt itself by its own elasticity, to the sides or faces of the polygonal pulleys I G, the angular teeth *h'* acting in the manner and with the elasticity of half-elliptic springs.

L is the seed-hopper, which rests upon the bed-frame A.

M are inclined boards, which form the bottom of the hopper, and which guide the seed down to the endless carrier H *h'*, by which it is carried forward and discharged directly in the rear of the opener N, into the furrow opened by said opener.

The opener N is made of wood, somewhat in the shape of a sleigh-runner, and its lower edge is rounded or beveled off to give the desired form to the furrow.

To the curved forward part of the opener N is attached a crescent-shaped cutter, *n'*, to cut off roots, stalks, and other obstructions.

O is a small triangular harrow attached to the forward part of the frame A, so as to stir up and loosen the soil upon both sides of the opener N.

The harrow Q, or a similar one, may be attached to the rear end of the frame A, when desired.

P is the agitator, by which the seed is kept stirred up in the lower part of the hopper L, to prevent it from clogging, and enable the carrier H *h'* to carry it out freely.

The agitator P is made curved or sickle-shaped, as shown in fig. 1, and its upper end or shank is attached to a shaft, Q, which revolves in bearings in the upper parts of the sides of the hopper L, and to the projecting ends of which are attached arms R, which project downward into such a position that their lower ends may be struck by the ends of the arms S secured to the axle B at right angles with each other, as shown in fig. 2, so that the agitator may be operated four times at each revolution of the drive-wheel.

To the upwardly-projecting end of the agitator P, or to a short arm attached to the shaft Q, is attached the rear end of the connecting-rod or coiled spring T, the forward end of which is attached to the upper end of the arm or spring U, the lower end of which is secured to the forward part of the frame A, as shown in fig. 1.

The connection T and arm U, one or both of which must be elastic, are designed to bring the agitator P back to its place with a quick movement when the arms R are released from the arms S.

If desired, four, more or less, of the sickle-shaped agitators P may be attached directly to the axle B, as shown in fig. 4. This arrangement is designed for use in planting cotton-seed; for planting other kinds of seeds the arrangement first described is used.

The sides of the furrow are pressed inward to cover the seed by the conical rollers V, which are placed apex to apex, and are pivoted to and between the lower ends of the bars W, the draft-strain upon which is sustained by the bars X, the rear ends of which are pivoted to the lower parts of the arm W, and the forward ends of which are pivoted to the rear part of the frame A.

To the upper ends of the bars W are pivoted the rear ends of the bars Y, the forward ends of which are pivoted to the upper parts of the sides of the hopper L.

The upper edges of the bars Y have several holes formed in them for the reception of the pins by which the driver's seat Z is secured to said arms, so that, by adjusting the position of the said seat Z, the driver's weight may be used to regulate the pressure of the covering-rollers V.

The machine may be adjusted for planting corn and other smooth seeds by placing a false bottom in the hopper L, and providing said false bottom with a dropping-slide, operated by the agitator P.

Having thus described my invention,

I claim as new and desire to secure by Letters Patent—

1. The endless-belt carrier H, formed of a continuous strip of sheet-steel bent into proper form to form the teeth or flanges $h$, substantially as herein shown and described, and for the purpose set forth.

2. The combination of the bars S with the arms R and agitator P, substantially as shown and described.

3. The combination of the arm U and connection T, whether one or both be elastic, with the agitator P, shaft Q, arms R, bars S, hopper L, and axle B, substantially as herein shown and described, and for the purpose set forth.

4. The pivoted clevis-block E, and adjusting-wedge F, in combination with the main frame of the planter, substantially as herein shown and described, and for the purpose set forth.

FLETCHER SLOAN.

Witnesses:
H. M. HILL,
J. H. LARWILL.